United States Patent
Yang et al.

(10) Patent No.: US 10,936,875 B2
(45) Date of Patent: Mar. 2, 2021

(54) METHOD AND APPARATUS FOR DETECTING SIGNIFICANCE OF PROMOTIONAL INFORMATION, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Yi Yang, Beijing (CN); Jiacheng Guo, Beijing (CN); Shanyu Wang, Beijing (CN); Lin Liu, Beijing (CN); Zhen Chen, Beijing (CN); Jianguo Wang, Beijing (CN); Cunchao Wei, Beijing (CN); Wei Lu, Beijing (CN); Yueran Dang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 112 days.

(21) Appl. No.: 16/228,581

(22) Filed: Dec. 20, 2018

(65) Prior Publication Data

US 2019/0197314 A1 Jun. 27, 2019

(30) Foreign Application Priority Data

Dec. 21, 2017 (CN) .......................... 201711395251.4

(51) Int. Cl.
G06K 9/00 (2006.01)
G06K 9/62 (2006.01)
G06Q 30/02 (2012.01)

(52) U.S. Cl.
CPC ..... G06K 9/00744 (2013.01); G06K 9/00718 (2013.01); G06K 9/00758 (2013.01);
(Continued)

(58) Field of Classification Search
CPC .......... G06K 9/00744; G06K 9/00718; G06K 9/623; G06K 9/6256; G06K 9/00758;
(Continued)

(56) References Cited

U.S. PATENT DOCUMENTS

| 10,572,735 B2* | 2/2020 | Han ........................ G11B 27/06 |
| 2004/0125877 A1* | 7/2004 | Chang ................ H04N 21/2343 |
| | | 375/240.28 |

(Continued)

FOREIGN PATENT DOCUMENTS

| CN | 104219559 A | 12/2014 |
| CN | 105472434 A | 4/2016 |

(Continued)

OTHER PUBLICATIONS

First Office Action and Search Report from CN app. No. 201711395251.4, dated Apr. 12, 2019, with English translation from Global Dossier.

Primary Examiner — Sheela C Chawan
(74) Attorney, Agent, or Firm — Ladas & Parry, LLP

(57) ABSTRACT

The present disclosure provides a method and apparatus for detecting significance of promotional information, a device and a computer storage medium. The method comprises: extracting each frame of image in a video segment, taking the image as input of a significance detecting module, and obtaining an output result of the significance detecting model; based on the output result, determining a significance score of promotional information corresponding to said each frame of image; obtaining the significance of promotional information corresponding to the video segment, based on the significance score of promotional information corresponding to each frame of image.

18 Claims, 3 Drawing Sheets

(52) U.S. Cl.
CPC ......... *G06K 9/00765* (2013.01); *G06K 9/623* (2013.01); *G06K 9/6256* (2013.01); *G06K 9/6268* (2013.01); *G06Q 30/0242* (2013.01); *G06K 2009/00738* (2013.01)

(58) Field of Classification Search
CPC ............. G06K 9/6268; G06K 9/00765; G06K 2009/00738; G06K 9/34; G06Q 30/0242
USPC ....... 382/100, 159, 103, 104, 155, 156, 157, 382/158, 160, 162, 165, 166, 167, 168, 382/173, 181, 232, 254, 276, 312; 725/1, 725/9, 14, 32, 36, 37, 38, 39, 40, 41, 43, 725/42, 67, 63, 86, 74, 78, 85, 82, 104, 725/116, 105, 114, 118, 121, 122, 135, 725/138; 709/219, 217
See application file for complete search history.

(56) References Cited

U.S. PATENT DOCUMENTS

| | | | | |
|---|---|---|---|---|
| 2011/0321084 | A1* | 12/2011 | Takahashi | H04N 5/23293 |
| | | | | 725/32 |
| 2014/0359656 | A1* | 12/2014 | Banica | H04N 21/234 |
| | | | | 725/32 |
| 2018/0122114 | A1* | 5/2018 | Luan | G06T 11/00 |

FOREIGN PATENT DOCUMENTS

| | | | |
|---|---|---|---|
| CN | 106164906 A | 11/2016 | |
| CN | 106651430 A | 5/2017 | |

* cited by examiner

METHOD AND APPARATUS FOR DETECTING SIGNIFICANCE OF PROMOTIONAL INFORMATION, DEVICE AND COMPUTER STORAGE MEDIUM

CROSS-REFERENCE TO RELATED APPLICATION

The present application claims the priority to Chinese Patent Application No. 201711395251.4, filed on Dec. 21, 2017, with the title of "Method and apparatus for detecting significance of promotional information, device and computer storage medium". The disclosure of the above application is incorporated herein by reference in its entirety.

FIELD OF THE DISCLOSURE

The present disclosure relates to the technical field of Internet technologies, and particularly to a method and apparatus for detecting significance of promotional information, a device and a computer storage medium.

BACKGROUND OF THE DISCLOSURE

As the Internet data increases explosively and artificial intelligence technology develops rapidly, products involved by promotional information in the video attract increasing attention and concerns, for example, pre-movie promotional information in the video and placement of promotional information in the video. However, when the pre-movie promotional information and placed promotional information are added into the video in the prior art, no thoughts are given to a degree of impact exerted by the position of the promotional information on the video content. If the added promotional information is located in a significant area of the viewed content, it will block the video content that is being viewed by the user, and seriously affect the user's viewing experience. Hence, it is desirable to provide a method capable of accurately detecting significance of promotional information in the video.

SUMMARY OF THE DISCLOSURE

In view of the above, embodiments of the present disclosure provide a method and apparatus for detecting significance of promotional information, a device and a computer storage medium, to accurately detect significance of promotional information in the video content, and thereby place promotional information in the video content more reasonably.

A technical solution employed by the present disclosure to solve the technical problem is to provide a method for detecting significance of promotional information, the method comprising: extracting each frame of image in a video segment, taking the image as input of a significance detecting module, and obtaining an output result of the significance detecting model; based on the output result, determining a significance score of promotional information corresponding to said each frame of image; obtaining the significance of promotional information corresponding to the video segment, based on the significance score of promotional information corresponding to each frame of image.

According to a preferred embodiment of the present disclosure, the significance detecting model is obtained by pre-training in the following manner: obtaining images which are already annotated with significant areas; training a classification model by taking respective images as input and taking significance annotation results of pixels in respective images as output, to obtain the significance detecting model.

According to a preferred embodiment of the present disclosure, before each frame of image in a video segment is extracted, the method further comprises: segmenting the video based on a position of a scenario switching frame in the video, to obtain more than one video segment; continuing to execute an operation of extracting each frame of image in the video segment with respect to each video segment.

According to a preferred embodiment of the present disclosure, the segmenting the video based on a position of a scenario switching frame, to obtain more than one video segment comprises: obtaining respective scenario switching frames in the video; determining occurrence time of the respective scenario switching frames in the video, and segmenting the video into a plurality of video segments based on the occurrence time.

According to a preferred embodiment of the present disclosure, the obtaining respective scenario switching frames in the video comprises: obtaining feature information of each frame of image in the video; comparing in turn whether the feature information between two frames of image matches, and in case of not matching, determining a preceding frame of image in the currently-compared two frames of images as the scenario switching frame.

According to a preferred embodiment of the present disclosure, the method further comprises: before taking the image as the input of the significance detecting model, performing super-resolution segmentation for the image.

According to a preferred embodiment of the present disclosure, the determining a significance score of promotional information corresponding to said each frame of image based on the output result comprises: determining a promotional information area in each frame of image; accumulating output results corresponding to pixels belonging to the promotional information area in the frame of image, and taking an accumulation result as the significance score of promotional information of this frame of image.

According to a preferred embodiment of the present disclosure, the accumulating output results corresponding to pixels belonging to the promotional information area in the frame of image comprises: accumulating output results corresponding to pixels in the promotional information area that satisfy a preset requirement.

According to a preferred embodiment of the present disclosure, the obtaining the significance of promotional information corresponding to the video segment, based on the significance score of promotional information corresponding to each frame of image comprises: integrating the significance scores of promotional information corresponding to each frame of image in the video segment, and obtaining the significance of promotional information corresponding to the video segment.

According to a preferred embodiment of the present disclosure, the classification model is a full convolutional neural network model.

According to a preferred embodiment of the present disclosure, the method further comprises: sending the significance of promotional information corresponding to the video segment to a video monitoring system, the video monitoring system adjusting the promotional information in the video segment.

A technical solution employed by the present disclosure to solve the technical problem is to provide an apparatus for detecting significance of promotional information, the apparatus comprising: a detecting unit configured to extract each frame of image in a video segment, take the image as input of a significance detecting module, and obtain an output result of the significance detecting model; a determining unit configured to, based on the output result, determine a significance score of promotional information corresponding to said each frame of image; an processing unit configured to obtain the significance of promotional information corresponding to the video segment, based on the significance score of promotional information corresponding to each frame of image.

According to a preferred embodiment of the present disclosure, the apparatus further comprises a training unit configured to pre-train to obtain the significance detecting model in the following manner: obtain images which are already annotated with significant areas; train a classification model by taking respective images as input and taking significance annotation results of pixels in respective images as output, to obtain the significance detecting model.

According to a preferred embodiment of the present disclosure, the apparatus further comprises a segmenting unit configured to, before each frame of image in a video segment is extracted, segment the video based on a position of a scenario switching frame in the video, to obtain more than one video segment; the detecting unit executes an operation of extracting each frame of image in the video segment with respect to each video segment.

According to a preferred embodiment of the present disclosure, upon segmenting the video based on a position of a scenario switching frame, to obtain more than one video segment, the segmenting unit specifically executes: obtaining respective scenario switching frames in the video; determining occurrence time of the respective scenario switching frames in the video, and segmenting the video into a plurality of video segments based on the occurrence time.

According to a preferred embodiment of the present disclosure, upon determining a significance score of promotional information corresponding to said each frame of image based on the output result, the determining unit specifically executes: determining a promotional information area in each frame of image; accumulating output results corresponding to pixels belonging to the promotional information area in the frame of image, and taking an accumulation result as the significance score of promotional information of this frame of image.

According to a preferred embodiment of the present disclosure, upon obtaining the significance of promotional information corresponding to the video segment, based on the significance score of promotional information corresponding to each frame of image, the obtaining unit specifically executes: integrating the significance scores of promotional information corresponding to each frame of image in the video segment, and obtaining the significance of promotional information corresponding to the video segment.

According to a preferred embodiment of the present disclosure, the apparatus further comprises a monitoring unit: send the significance of promotional information corresponding to the video segment to a video monitoring system, the video monitoring system adjusting the promotional information in the video segment.

As can be seen from the above technical solutions, in the present disclosure, it is possible to perform analysis for the video content, and use the significance detecting model to obtain the significance detection result of each frame of image in the video, thereby obtaining the significance of promotional information of the video segment, and implementing accurate judgment of whether the promotional information is located in the significant area in the video content.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when . . . (stated condition or event) is detected" or "responsive to detecting (stated condition or event)".

Regarding content that is being viewed, the user is only interested in partial area in the viewed content and not interested in remaining areas. A significance area refers to an area in the viewed content that best attracts the user's interest and best manifests the viewed content. Hence, in the present disclosure, it is possible to perform analysis for the video content, detect significance of the promotional information in the video content, and thereby more accurately judge whether the promotional information in the video content is located in the significant area of the video content and affects the user's viewing.

Figure 1:
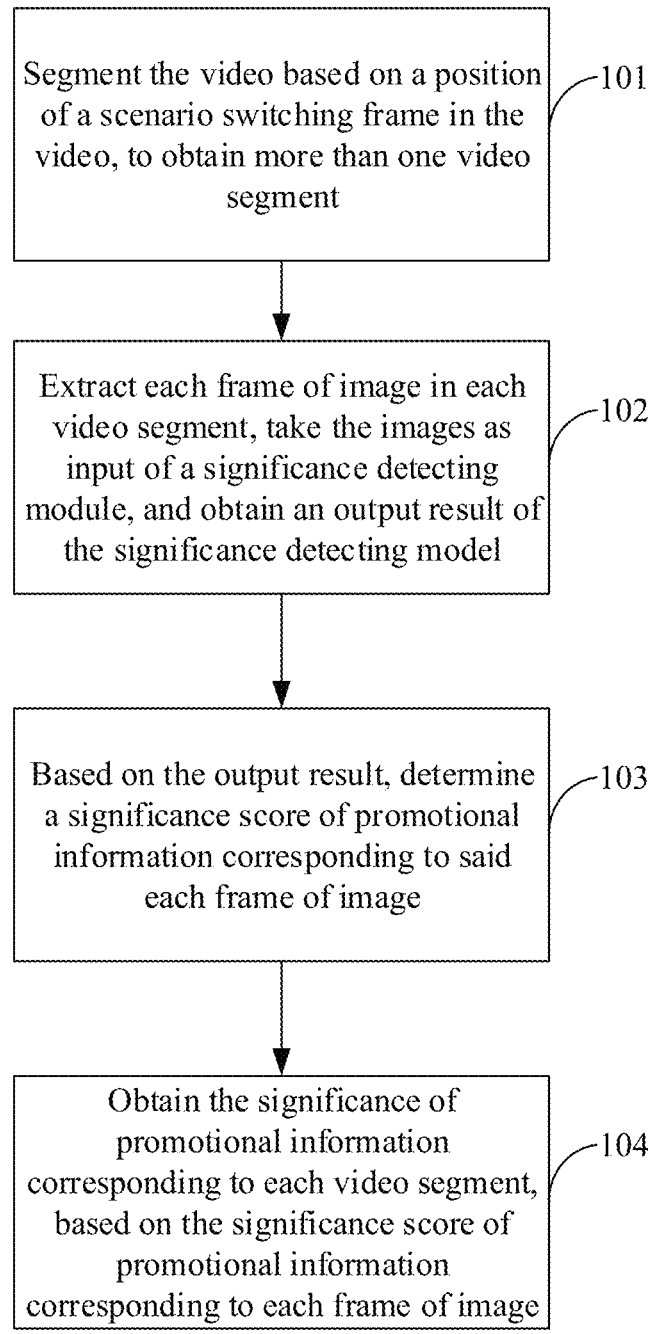
FIG. 1 is a flow chart of a method for detecting significance of promotional information according to an embodiment of the present disclosure.

FIG. 1 is a flow chart of a method for detecting significance of promotional information according to an embodiment of the present disclosure. As shown in FIG. 1, the method comprises:

In 101, segment the video based on a position of a scenario switching frame in the video, to obtain more than one video segment.

In this step, it is possible to first obtain the scenario switching frame included in the video, then determine a position of the obtained scenario switching frame in the video, and finally segment the video according to the determined position of the scenario switching frames to thereby obtain more than one video segment. It may be appreciated that if the current video is already known as a video under a production scenario, it is unnecessary to segment the video, but directly detect the significance of each frame of image in the video.

It may be appreciated that one video might consist of a plurality of production scenarios. A purpose of this step is segmenting the video into more than one video segment according to different production scenarios. The scenario switching frame in the video is used to represent an image in the video when scenario switching is performed, namely, the scenario switching frame and next neighboring frame of image belong to two different production scenarios in the video. Hence, segmenting the video based on the scenario switching frame in the video enables more than one video segment obtained from the segmentation to respectively belong to different production scenarios.

Specifically, the following manner may be employed upon obtaining the scenario switching frame in the video: obtaining feature information of each frame of image in the video, wherein the feature information of each frame of image may comprise color histogram information of the image, feature point information of the image, and so on; compare in turn whether the feature information between two frames of image in the video matches, wherein the two frames of image belong to the same production scenario if the feature information between the two frames of image matches; the two frames of image do not belong to the same production scenario if the feature information between the two frames of image does not match, whereupon a preceding frame of image in the currently-compared two frames of image is determined as the scenario switching frame.

After obtaining the scenario switching frame in the video, it is possible to determine occurrence time of the scenario switching frame in the video, take the occurrence time of respective scenario switching frames as positions of respective scenario switching frames, and then segment the video based on the occurrence time of the respective scenario switching frames to obtain more than one video segment. That is to say, the more than one video segment obtained from segmenting according to respective scenario switching frames is video segment corresponding to different production scenarios, and each video segment corresponds to the same production scenario.

In 102, extract each frame of image in each video segment, take the images as input of a significance detecting module, and obtain an output result of the significance detecting model.

When the user views the video, eyes usually selectively focus attention to some most attractive contents in the viewed content to quickly and effectively obtain important information therefrom. These most attractive contents correspond to significant areas of the viewed content. Hence, the present step is used to obtain the significant area of each frame of image in the video.

In this step, it is possible to first extract each frame of image in each video segment, then use the significance detecting model obtained by pre-training, to obtain a significance detection result output by the significance detecting model and corresponding to each frame of image.

Specifically, the significance detecting model may be obtained by pre-training in the following manner: obtain images which are already annotated with significant areas, wherein upon annotating the image, it is possible to annotate a pixel in the image located in the significant area as 1, and annotate pixels located in other areas as 0. It is also possible to annotate the image according to division levels of the significant area, for example, divide the pixels in the image into five levels according to the levels of significance; train a classification model by taking respective images as input and taking significance annotation results of pixels in respective images as output, to obtain the significance detecting model. In this step, the classification model used may comprise a full convolutional neural network model, a support vector machine and so on. This is not limited in the present disclosure.

Before taking the image as the input of the significance detecting model, it is further possible to perform super-resolution segmentation for the image, and take an image segmentation result as the input of the significance detecting model. Performing super-resolution segmentation for the image can further improve a precision degree of the significance detecting model detecting the image significance.

Figure 2:
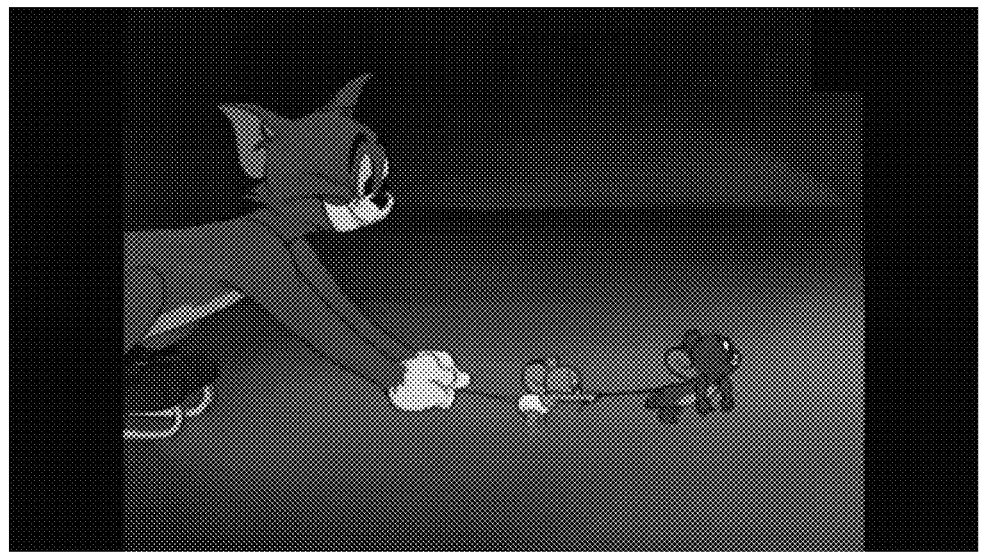
FIG. 2 is an image input into a significance detecting model according to an embodiment of the present disclosure.
Figure 3:
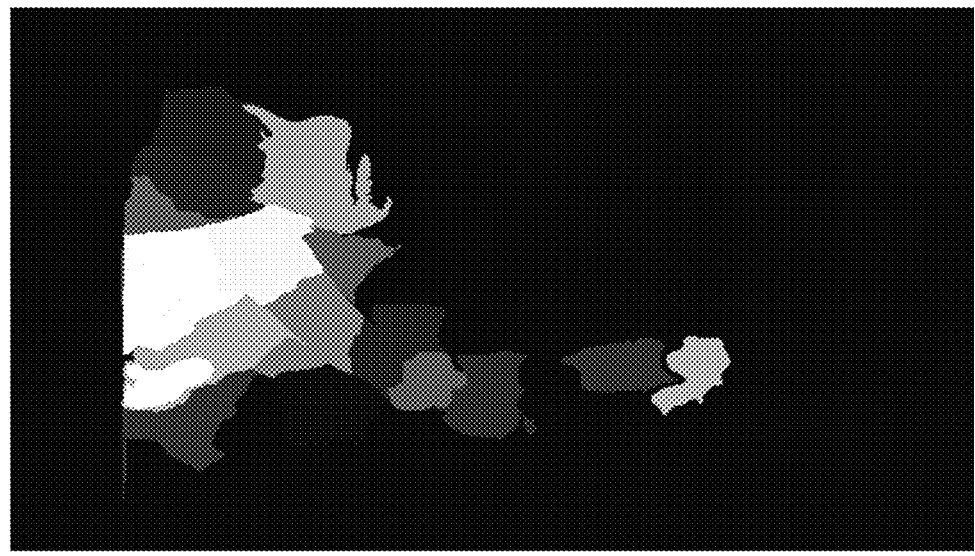
FIG. 3 is a schematic diagram of an output result of the significance detecting model according to an embodiment of the present disclosure.

In this step, the output result of the significance detecting model represents the detection result of the image significant area, namely, the significance area of each frame of image can be obtained through the output result of the significance detecting model. As shown in FIG. 2 and FIG. 3, FIG. 2 is an original image input into the significance detecting model. FIG. 3 is the detection result of the significant area of the image output by the significance detecting model. A whiter portion in the output result indicates that the significance of the image is higher, and a less white portion indicates that the significance of the image is lower.

In 103, based on the output result, determine a significance score of promotional information corresponding to said each frame of image.

In this step, it is possible to first determine a promotional information area in each frame of image, and then obtain the significance score of promotional information corresponding to said each frame of image, based on the detection result of the significant area obtained in step 102. It is possible to determine the promotional information area in each frame of image by using a recognition algorithm of the promotional information image or according to a default promotional information occurrence position. The method of determining the promotional information area is not limited in the present disclosure.

Specifically, upon obtaining the significance score of promotional information corresponding to each frame of image, it is possible to directly accumulate significance detection results of respective pixels in the promotional information area output by the significance detecting model, as the significance score of promotional information corresponding to said each frame of image; it is also possible to only accumulate values satisfying a preset requirement among the significance detection results of respective pixels in the promotional information area output by the significance detecting model, as the significance score of promotional information corresponding to this frame of image.

For example, the promotional information area of one frame of image includes three pixels, the significance detection results of the three pixels output by the significance detecting model are 1, 0.2 and 0.7 respectively. Upon determining the significance score of promotional information corresponding to this frame of image, it is possible to directly take an accumulation result 1.9 of the three values, as the significance score of promotional information corresponding to this frame of image; it is also possible to only accumulate values exceeding a preset threshold: if the preset threshold is 0.6, it is possible to only accumulate 1 and 0.7, and take the accumulation result 1.7, as the significance score of promotional information corresponding to this frame of image.

In 104, obtain the significance of promotional information corresponding to each video segment, based on the significance score of promotional information corresponding to each frame of image.

In this step, the significance of promotional information corresponding to each video segment is obtained based on the significance score of promotional information corresponding to each frame of image in the video determined in step 103.

Upon obtaining the significance of promotional information corresponding to each video segment, it is possible to obtain the significance of promotional information by normalizing the significance score of promotional information corresponding to each frame of image in the video segment. Specifically, normalizing may be performed in the following manner: determine a total number of frames of images included in each video segment; respectively accumulate the significance score of promotional information corresponding to each frame of image in each video segment; divide an accumulation result of the significance scores of promotional information in each video segment respectively by the total number of frames of images included in each video segment, and take a calculation result as the significance of promotional information corresponding to each video segment. Upon obtaining the significance of promotional information corresponding to each video segment, it is possible to accumulate the significance score of promotional information corresponding to each frame of image in each video segment, and directly take the accumulation result as the significance of promotional information of each video segment.

Since the significant area of the image represents an area in the image to which people's eyes focus attention, if the significance of promotional information corresponding to each video segment is higher, this indicates that the promotional information existing in the video segment blocks more key content of the video, thereby affecting the user's viewing.

After obtaining the significance of promotional information in each video segment, it is further possible to perform the following processing: sending the obtained significance of promotional information to a video monitoring system, the video monitoring system judging whether the promotional information existing in each video segment is reasonable according to the significance of promotional information corresponding to each video segment, and adjusting the promotional information existing in the video segment if it is unreasonable. It is further possible to send the obtained significance of promotional information to a video monitoring staff member, the video monitoring staff member adjusting the promotional information in the respective videos according to the significance of promotional information, so that the promotional information is not located in the image significant area and does not affect the user's viewing.

Figure 4:
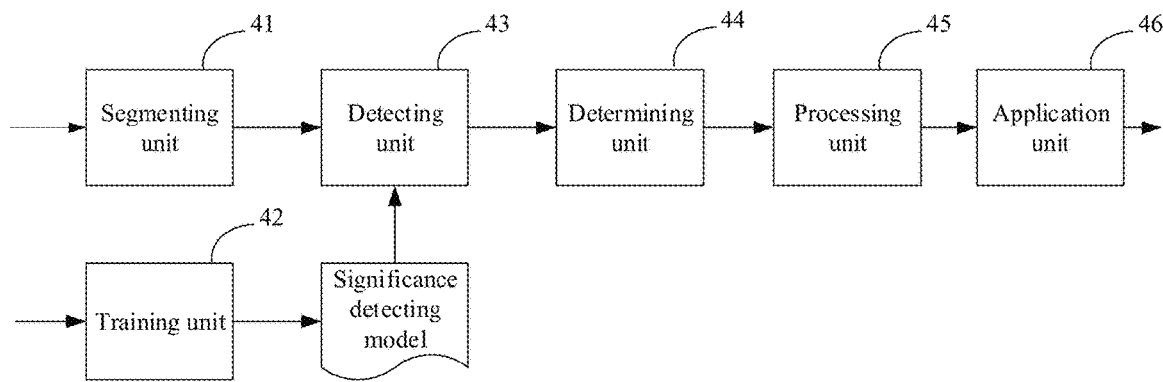
FIG. 4 is a block diagram of an apparatus for detecting significance of promotional information according to an embodiment of the present disclosure.

FIG. 4 is a block diagram of an apparatus for detecting significance of promotional information according to an embodiment of the present disclosure. As shown in FIG. 4, the apparatus comprises: a segmenting unit 41, a training unit 42, a detecting unit 43, a determining unit 44, a processing unit 45 and an application unit 46.

The segmenting unit 41 is configured to segment the video based on a position of a scenario switching frame in the video, to obtain more than one video segment.

The segmenting unit 41 is configured to first obtain the scenario switching frame included in the video, then determine a position of the obtained scenario switching frame in the video, and finally segment the video according to the determined positions of the scenario switching frames to thereby obtain more than one video segment. It may be appreciated that if the current video is already known as a video under a production scenario, it is unnecessary that the segmenting unit 41 segments the video, but instead, the detecting unit 42 directly detects the significance of each frame of image in the video.

It may be appreciated that one video might consist of a plurality of production scenarios. The segmenting unit 41 aims to segment the video into more than one video segment according to different production scenarios. The scenario switching frame in the video is used to represent an image in the video when scenario switching is performed, namely, the scenario switching frame and next neighboring frame of image belong to two different production scenarios in the video. Hence, the segmenting unit 41 segments the video based on the scenario switching frame in the video, to enable more than one video segment obtained from the segmentation to respectively belong to different production scenarios.

Specifically, the segmenting unit 41 may employ the following manner upon obtaining the scenario switching frame in the video: obtaining feature information of each frame of image in the video, wherein the feature information of each frame of image may comprise color histogram information of the image, feature point information of the image, and so on; compare in turn whether the feature information between two frames of image in the video matches, wherein the two frames of image belong to the same production scenario if the feature information between the two frames of image matches; the two frames of image do not belong to the same production scenario if the feature information between the two frames of image does not match, whereupon a preceding frame of image in the currently-compared two frames of image is determined as the scenario switching frame.

After obtaining the scenario switching frame in the video, the segmenting unit 41 may determine occurrence time of the scenario switching frame in the video, take the occurrence time of respective scenario switching frames as positions of respective scenario switching frames, and then segment the video based on the occurrence time of the respective scenario switching frames to obtain more than one video segment. That is to say, the more than one video segment obtained by the segmenting unit 41 segmenting according to respective scenario switching frames is a video segment corresponding to different production scenarios, and each video segment corresponds to the same production scenario.

The training unit 42 is configured to pre-train to obtain the significance detecting model.

Specifically, the training unit 42 may employ the following manner upon training the significance detecting model: obtain images which are already annotated with significant areas, wherein upon annotating the image, it is possible to annotate a pixel in the image located in the significant area as 1, and annotate pixels located in other areas as 0. It is also possible to annotate the image according to division levels of the significant area, for example, divide the pixels in the image into five levels according to the levels of significance; train a classification model by taking respective images as input and taking significance annotation results of pixels in respective images as output, to obtain the significance detecting model. The classification model used by the training unit 42 may comprise a full convolutional neural network model, a support vector machine and so on. This is not limited in the present disclosure.

The detecting unit 43 is configured to extract each frame of image in each video segment, take the images as input of a significance detecting module, and obtain an output result of the significance detecting model.

When the user views the video, eyes usually selectively focus attention to some most attractive contents in the viewed content to quickly and effectively obtain important information therefrom. These most attractive contents correspond to significant areas of the viewed content. Hence, the detecting unit 43 is used to obtain the significant area of each frame of image in the video.

The detecting unit 43 first extracts each frame of image in each video segment, then use the significance detecting model obtained by the training unit 42 by pre-training, to obtain a significance detection result output by the significance detecting model and corresponding to each frame of image.

Before taking the image as the input of the significance detecting model, the detecting unit 43 may further perform super-resolution segmentation for the image, and take an image segmentation result as the input of the significance detecting model. Performing super-resolution segmentation for the image can further improve a precision degree of the significance detecting model detecting the image significance.

The output result of the significance detecting model obtained by the detecting unit 43 represents the detection result of the image significant area, namely, the significance area of each frame of image can be obtained through the output result of the significance detecting model.

The determining unit 44 is used to, based on the output result, determine a significance score of promotional information corresponding to said each frame of image.

The determining unit 44 first determines a promotional information area in each frame of image, and then obtains the significance score of promotional information corresponding to said each frame of image, based on the detection result of the significant area obtained by the detecting unit 43. The determining unit 44 determines the promotional information area in each frame of image by using a recognition algorithm of the promotional information image or according to a default promotional information occurrence position. The method of determining the promotional information area is not limited in the present disclosure.

Specifically, the determining unit 44, upon obtaining the significance score of promotional information corresponding to each frame of image, may directly accumulate significance detection results of respective pixels in the promotional information area output by the significance detecting model, as the significance score of promotional information corresponding to said each frame of image; it is also possible to only accumulate values satisfying a preset requirement among the significance detection results of respective pixels in the promotional information area output by the significance detecting model, as the significance score of promotional information corresponding to this frame of image.

The processing unit 45 is configured to obtain the significance of promotional information corresponding to each video segment, based on the significance score of promotional information corresponding to each frame of image.

The processing unit 45 obtains the significance of promotional information corresponding to each video segment based on the significance score of promotional information corresponding to each frame of image in the video determined by the determining unit 44.

The processing unit 45, upon obtaining the significance of promotional information corresponding to each video segment, may obtain the significance of promotional information by normalizing the significance score of promotional information corresponding to each frame of image in the video segment. Specifically, the processing unit 45 normalizes in the following manner: determine a total number of frames of images included in each video segment; respectively accumulate the significance score of promotional information corresponding to each frame of image in each video segment; divide an accumulation result of the significance scores of promotional information in each video segment respectively by the total number of frames of images included in each video segment, and take a calculation result as the significance of promotional information corresponding to each video segment. Upon obtaining the significance of promotional information corresponding to each video segment, the processing unit 45 may also accumulate the significance score of promotional information corresponding to each frame of image in each video segment, and directly take the accumulation result as the significance of promotional information of each video segment.

The application unit 46 is configured to use the significance of promotional information to adjust the promotional information in each video segment.

Since the significant area of the image represents an area in the image to which people's eyes focus attention, if the significance of promotional information corresponding to each video segment is higher, this indicates that the promotional information existing in the video segment blocks more key content of the video, thereby affecting the user's viewing.

Therefore, the application unit 46 uses the significance of promotional information obtained by the processing unit 45 to adjust the promotional information in each video segment. After obtaining the significance of promotional information in each video segment, the application unit 46 may send the obtained significance of promotional information to a video monitoring system, the video monitoring system judging whether the promotional information existing in each video segment is reasonable according to the significance of promotional information corresponding to each video segment, and adjusting the promotional information existing in the video segment if it is unreasonable. The application unit 46 may also send the obtained significance of promotional information to a video monitoring staff member, the video monitoring staff member adjusting the promotional information in the respective videos according to the significance of promotional information, so that the promotional information is not located in the image significant area and does not affect the user's viewing.

Figure 5:
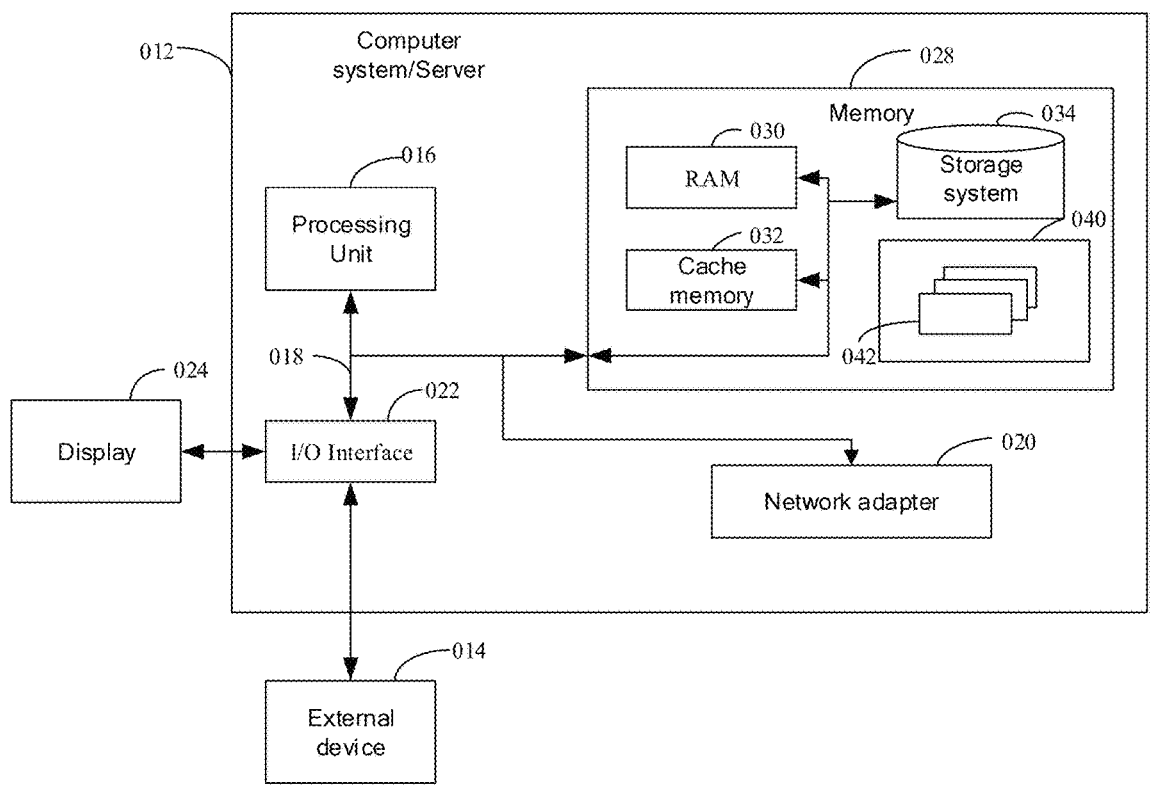
FIG. 5 is a block diagram of a computer system/server according to an embodiment of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device.

The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 5, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement a method for detecting significance of promotional information, comprising:

extracting each frame of image in each video segment, take the images as input of a significance detecting module, and obtain an output result of the significance detecting model;

based on the output result, determining a significance score of promotional information corresponding to said each frame of image;

obtaining the significance of promotional information corresponding to each video segment, based on the significance score of promotional information corresponding to each frame of image.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the steps of the method performed by the one or more processors may comprise:

extracting each frame of image in each video segment, take the images as input of a significance detecting module, and obtain an output result of the significance detecting model;

based on the output result, determining a significance score of promotional information corresponding to said each frame of image;

obtaining the significance of promotional information corresponding to each video segment, based on the significance score of promotional information corresponding to each frame of image.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The technical solutions according to the present disclosure may be employed to perform analysis for the video, use the significance detecting model to obtain the significance detection result of each frame of image in the video, then determine the significance of promotional information of the video segment based on the significance detection result of each frame of image, thereby implementing accurate judgment of whether the promotional information is located in the significant area of the video content and affects the user's viewing.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium comprises various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for detecting significance of promotional information, wherein the method comprises:
   extracting each frame of image in a video segment, taking the image as input of a significance detecting module, and obtaining an output result of the significance detecting model;
   determining a promotional information area in each frame of image;
   accumulating output results corresponding to pixels belonging to the promotional information area in the frame of image, and taking an accumulation result as significance score of promotional information of this frame of image; and
   obtaining the significance of promotional information corresponding to the video segment, based on the significance score of promotional information corresponding to each frame of image.

2. The method according to claim 1, wherein the significance detecting model is obtained by pre-training in the following manner:
   obtaining images which are already annotated with significant areas;
   training a classification model by taking respective images as input and taking significance annotation results of pixels in respective images as output, to obtain the significance detecting model.

3. The method according to claim 2, wherein the classification model is a full convolutional neural network model.

4. The method according to claim 1, wherein before each frame of image in a video segment is extracted, the method further comprises:
   segmenting the video based on a position of a scenario switching frame in the video, to obtain more than one video segment;
   continuing to execute an operation of extracting each frame of image in the video segment with respect to each video segment.

5. The method according to claim 4, wherein the segmenting the video based on a position of a scenario switching frame, to obtain more than one video segment comprises:
   obtaining respective scenario switching frames in the video;
   determining occurrence time of the respective scenario switching frames in the video, and segmenting the video into a plurality of video segments based on the occurrence time.

6. The method according to claim 5, wherein the obtaining respective scenario switching frames in the video comprises:
   obtaining feature information of each frame of image in the video;
   comparing in turn whether the feature information between two frames of image matches, and in case of not matching, determining a preceding frame of image in the currently-compared two frames of images as the scenario switching frame.

7. The method according to claim 1, wherein the method further comprises:
before taking the image as the input of the significance detecting model, performing super-resolution segmentation for the image.

8. The method according to claim 1, wherein the accumulating output results corresponding to pixels belonging to the promotional information area in the frame of image comprises:
accumulating output results corresponding to pixels in the promotional information area that satisfy a preset requirement.

9. The method according to claim 1, wherein the obtaining the significance of promotional information corresponding to the video segment, based on the significance score of promotional information corresponding to each frame of image comprises: integrating the significance scores of promotional information corresponding to each frame of image in the video segment, and obtaining the significance of promotional information corresponding to the video segment.

10. The method according to claim 1, wherein the method further comprises:
sending the significance of promotional information corresponding to the video segment to a video monitoring system, the video monitoring system adjusting the promotional information in the video segment.

11. A device, wherein the device comprises:
one or more processors,
a storage for storing one or more programs,
the one or more programs, when executed by said one or more processors, enable said one or more processors to implement a method for detecting significance of promotional information, wherein the method comprises:
extracting each frame of image in a video segment, taking the image as input of a significance detecting module, and obtaining an output result of the significance detecting model;
determining a promotional information area in each frame of image;
accumulating output results corresponding to pixels belonging to the promotional information area in the frame of image, and taking an accumulation result as significance score of promotional information of this frame of image; and
obtaining the significance of promotional information corresponding to the video segment, based on the significance score of promotional information corresponding to each frame of image.

12. The device according to claim 11, wherein the significance detecting model is obtained by pre-training in the following manner:
obtaining images which are already annotated with significant areas;
training a classification model by taking respective images as input and taking significance annotation results of pixels in respective images as output, to obtain the significance detecting model.

13. The device according to claim 11, wherein before each frame of image in a video segment is extracted, the method further comprises:
segmenting the video based on a position of a scenario switching frame in the video, to obtain more than one video segment;
continuing to execute an operation of extracting each frame of image in the video segment with respect to each video segment.

14. The device according to claim 13, wherein the segmenting the video based on a position of a scenario switching frame, to obtain more than one video segment comprises:
obtaining respective scenario switching frames in the video;
determining occurrence time of the respective scenario switching frames in the video, and segmenting the video into a plurality of video segments based on the occurrence time.

15. The device according to claim 14, wherein the obtaining respective scenario switching frames in the video comprises:
obtaining feature information of each frame of image in the video;
comparing in turn whether the feature information between two frames of image matches, and in case of not matching, determining a preceding frame of image in the currently-compared two frames of images as the scenario switching frame.

16. The device according to claim 11, wherein the method further comprises:
before taking the image as the input of the significance detecting model, performing super-resolution segmentation for the image.

17. The device according to claim 11, wherein the accumulating output results corresponding to pixels belonging to the promotional information area in the frame of image comprises:
accumulating output results corresponding to pixels in the promotional information area that satisfy a preset requirement.

18. A non-transitory computer readable medium including computer-executable instructions which, when executed by a computer processor, execute a method for detecting significance of promotional information, wherein the method comprises:
extracting each frame of image in a video segment, taking the image as input of a significance detecting module, and obtaining an output result of the significance detecting model;
determining a promotional information area in each frame of image;
accumulating output results corresponding to pixels belonging to the promotional information area in the frame of image, and taking an accumulation result as significance score of promotional information of this frame of image; and
obtaining the significance of promotional information corresponding to the video segment, based on the significance score of promotional information corresponding to each frame of image.

* * * * *